Sept. 13, 1966  B. M. CRAIG  3,272,301
EMBOSSING TOOL HAVING REMOVABLE DIE UNITS
TO ACCOMMODATE VARIOUS WIDTH TAPES
Filed Aug. 10, 1964  5 Sheets-Sheet 3

INVENTOR.
BURNIE M. CRAIG
BY
Christie, Parker & Hale
ATTORNEYS.

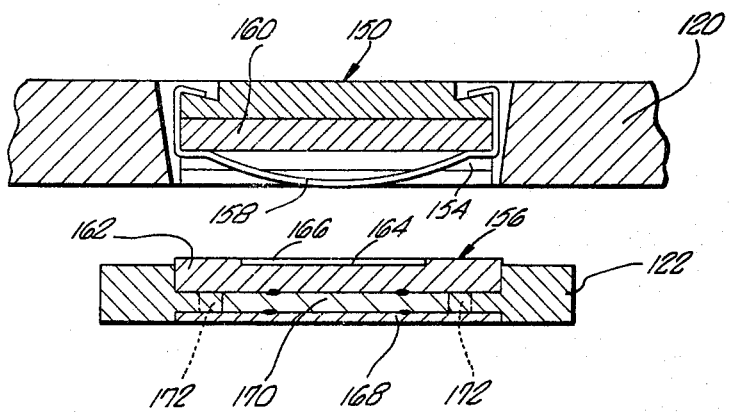
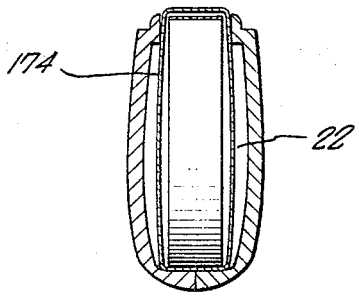
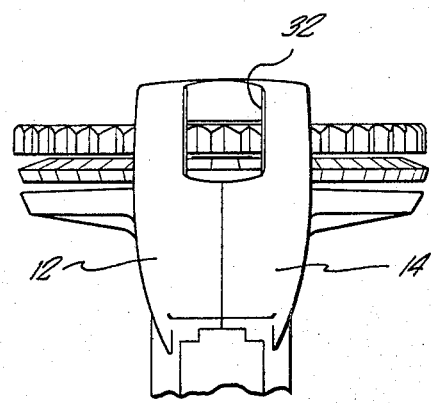

Sept. 13, 1966 B. M. CRAIG 3,272,301
EMBOSSING TOOL HAVING REMOVABLE DIE UNITS
TO ACCOMMODATE VARIOUS WIDTH TAPES
Filed Aug. 10, 1964 5 Sheets-Sheet 5

INVENTOR.
BURNIE M. CRAIG
BY
Christie, Parker Hale
ATTORNEYS.

United States Patent Office 3,272,301
Patented Sept. 13, 1966

3,272,301
EMBOSSING TOOL HAVING REMOVABLE DIE UNITS TO ACCOMMODATE VARIOUS WIDTH TAPES
Burnie M. Craig, Pasadena, Calif., assignor to Avery Products Corporation, Pasadena, Calif., a corporation of California
Filed Aug. 10, 1964, Ser. No. 388,596
15 Claims. (Cl. 197—6.7)

This invention relates to marking or embossing tools by which characters or other indicia are impressed on strips of embossable material.

Hand held embossing tools are widely used for embossing alphabetical or numerical characters or other symbols upon strips or tapes of an embossable material. Generally, the strip is formed of metal, plastic, or other embossable material, and is provided with an adhesive backing so that the embossed tape may be secured to an object as a label. To this end, embossing tools conventionally include means for severing the embossed portion of the strip from the remainder of the strip.

The symbols are embossed on the strip by rotating a pair of die discs to position at an embossing station any one of a set of pairs of corresponding male and female embossing dies. The selected die pair is actuated, as by squeeze handles, so that the chosen character is embossed upon the strip which is between the selected male and female embossing dies. The user sequentially selects and embosses the desired symbols to compose words or other information.

The strip may be automatically advanced to position it for embossing of a succeeding symbol. This may be accomplished by a suitable intermittent feed arrangement for advancing the strip or tape between embossing operations. Preferably, this advance occurs immediately following each embossing operation, as by release of the squeeze handles which have been actuated to perform the embossing step.

Embossed strips produced by embossing tools of the character described have found a wide variety of uses. This widespread utility has engendered need for symbols of different sizes on tapes of varying widths. In addition, different combinations of symbols are required to meet the diverse application of the embossed strips, as, for example, in the case of different languages. A single pair of die discs cannot practically fulfill these various requirements. A disadvantage of prior art embossing tools has been that they do not enable convenient interchangeability of die disc pairs and cannot accommodate tapes of varying widths to accompany changes in symbol sizes.

Further, in the prior art tools of the character generally described above, detents or springs have been utilized to engage appropriately positioned recesses or grooves in one of the die discs in order that the dies for a selected symbol are aligned with the strip during the embossing operation. The detent bears against the unrecessed portion of the disc while it is rotated and slips into the recess at the selected position. So that rotation of the die discs to the desired position is not unduly restricted, as would be the case through use of a detent having a strong spring action, the die discs are retained in the selected position by a relatively weak force. Resultingly, displacement of a symbol from alignment with other embossed symbols on the strip can occur.

The present invention overcomes the previously discussed disadvantages of prior art tools and provides an embossing tool which significantly enlarges the versatility of these devices.

As an aspect of the present invention, the die discs together with other elements operative to advance the strip to position it for embossing symbols are incorporated in an easily removable unitary die assembly which, when inserted in the tool body, cooperates with elements of the tool body to perform the embossing operation. The tool body is adapted whereby it can accommodate tapes of varying widths enabling use of a single tool body with different die assemblies incorporating different die discs. Through this feature, the demands for different symbol sizes and different symbol combinations are conveniently met.

As another aspect of the present invention, the embossing tool includes an arrangement by which one of the discs of the die disc pair is weakly engaged by indexing means to hold a selected pair of dies at the embossing station of the tool and is then forcefully engaged by the indexing means simultaneously with actuation of selected pairs of dies to emboss the strip. By this arrangement, rotation of the die discs to the desired position is effected against a restraint having a force only sufficient to enable convenient selection of the position. However, simultaneously with the embossing step, at which point true alignment is essential, a force which is substantially greater than the above described first force engages the disc to insure that the alignment of the dies and the strip is precisely maintained.

A further feature of the present invention is a novel arrangement by which positive registration between the opposed pair of die discs is obtained while enabling radial outfeed of the strip material from the embossing and cutting station. As disclosed in the pending application, Serial No. 255,033, filed January 30, 1963, and assigned to the same assignee, the handedness of tools of this nature is a serious inconvenience. Tools designed for right-handed persons cannot be conveniently used by left-handed persons, and vice versa. The above-described application discloses a tool structure by which handedness is minimized or eliminated. As a feature of the present invention, a single inclined gear engages gear teeth in each of the two die discs to provide positive registration of the discs. This is accomplished without impeding radial outfeed of the strip material.

The above-discussed aspects of the present invention as well as others will be more readily understood from the following description made in conjunction with the accompanying drawings in which:

FIG. 4 is a front elevational view of the tool base of FIG. 3;

FIG. 5 is a plan view generally taken along line 5—5 of FIG. 3 and showing the operative elements within the tool base;

FIG. 8 is an enlarged sectional view showing the cut-off dies generally taken along line 8—8 of FIG. 1; and FIG. 9 is a sectional view taken along line 9—9 of FIG. 3.

Figure 1:
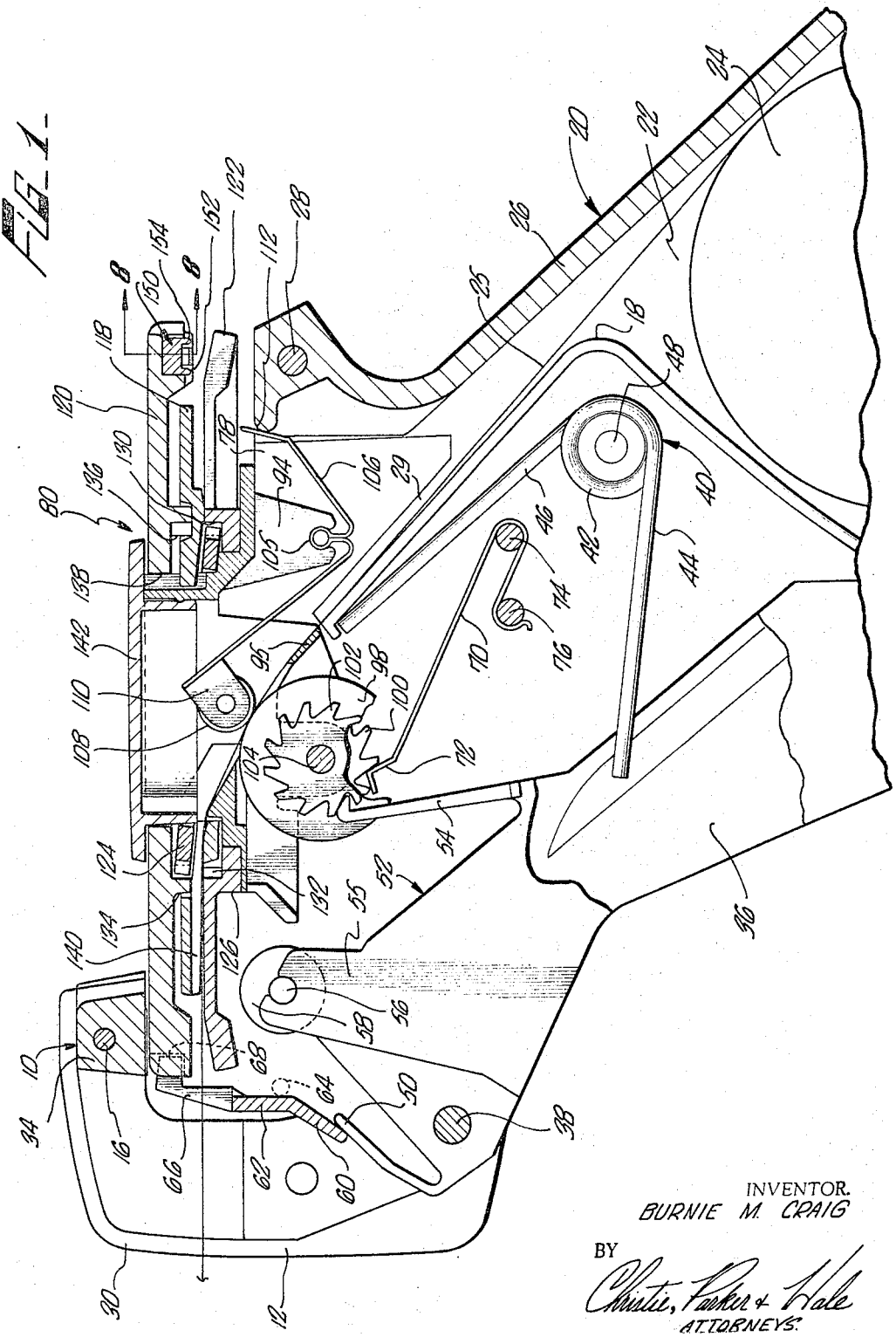
FIG. 1 is a median vertical sectional view of the embossing tool according to the present invention.

In the embodiment of the invention shown in the drawings, a rigid hollow molded plastic tool base 10 is formed by joining together with adhesive bonding or mechanical fasteners a side wall 12 and a closure wall 14 (see FIG. 4). The walls are fitted together on pins, such as pin 16, and are separated by internal bridging members of which one is identified by reference character 18. A portion of the tool base is shaped to provide at one longitudinal end a handle 20 within which is formed a compartment 22 for accommodating a roll 24 of embossable tape 25. A hinged cover plate 26, mounted on a hinge pin 28 supported at opposite ends in the side wall and the closure wall, provides access to compartment 22 within the handle. An inclined tool base tape channel 29 (see FIG. 5) extends upwardly from compartment 22 toward the center of the tool base.

The tape path through the tool, as will be later described, terminates in an outfeed end 30 located at the other longitudinal end of the tool base. As particularly shown in FIG. 4, the side wall and closure wall are recessed at the outfeed end to form a vertical outfeed aperture 32 through which the tape passes as it leaves the embossing tool. A metal insert 34, fitted between the walls at the outfeed end, reinforces the outfeed end since the principal embossing force is concentrated at this end of the tool. As shown in FIG. 5, aperture 32 includes a horizontally extending portion to provide an opening 35 which enables the last embossed symbol on the tape to be seen from above the tool as soon as the tape is advanced from the embossing station.

A lever 36, shown in its lowermost and disengaged position in FIG. 1, is hinged to a shaft 38. The lever is accommodated within a longitudinally extending opening in the underside of the tool base. Although not shown, a lip at the end of the lever remote from shaft 38 engages a transverse flange extending from the side wall and thereby prevents lowering of the lever beyond the position shown in FIG. 1. A return spring 40 consists of a coil 42 of several turns and longitudinal extensions 44, 46. The coil is slipped over a pin 48 extending from the side wall and the extensions are biased between internal bridging member 18 and a portion of lever 36 within the tool base.

Integrally formed as part of the lever are three operative elements, a force finger 50, a roller carrier 52, and a pawl 54. Although it is convenient to form these elements integrally in molding of the lever, it will be understood that each can be suitably fastened to the lever as separate elements. The roller carrier is bifurcated (see FIG. 5) to provide a yoke 55 within which a shaft 56 is frictionally fitted. An actuating roller 58 is mounted on the shaft.

In the lowermost position of the lever, force finger 50 abuts at its upper end a tab 60 depending from a skirt 62. A portion of the skirt (not shown) is rotatably fitted on a shaft 64 (shown in hidden lines FIG. 1) so that movement of the tab responsive to application of a force against it rotates the skirt on its shaft. A detent 66 is integrally joined to one end of the skirt and projects upwardly from it. The detent is positioned so that a projecting head, tapered to form a sharp edge 68, engages a die disc, as will be described.

A feed latch spring 70, consisting of a flat spring with a catch 72 at one end, is wrapped at its other end around two spaced-apart pins 74, 76 fitted into the side wall of the tool base. As shown in FIG. 5, catch 72 of the feed latch spring and pawl 54 are in spaced-apart vertical planes. These elements are positioned so that they act in conjunction with the tape feed elements, as will be described.

The elements described to this point are joined to the tool base. As one aspect of the present invention, the elements now to be described can be incorporated into a unitary die assembly so that, while in the tool base, they cooperate with elements in the tool base to feed, emboss, and cut the tape. Through a unitary assembly, interchangeability of different assemblies with a single tool base to enable variations of symbol sizes and combinations is provided. It will be understood, however, that other aspects of the invention, already described and to be described, can be used with elements in a unitary assembly or with the same elements as part of the tool base. With the further understanding that the elements now to be described can be joined to the tool base as required, such elements will be described as part of a unitary die assembly.

Figure 3:
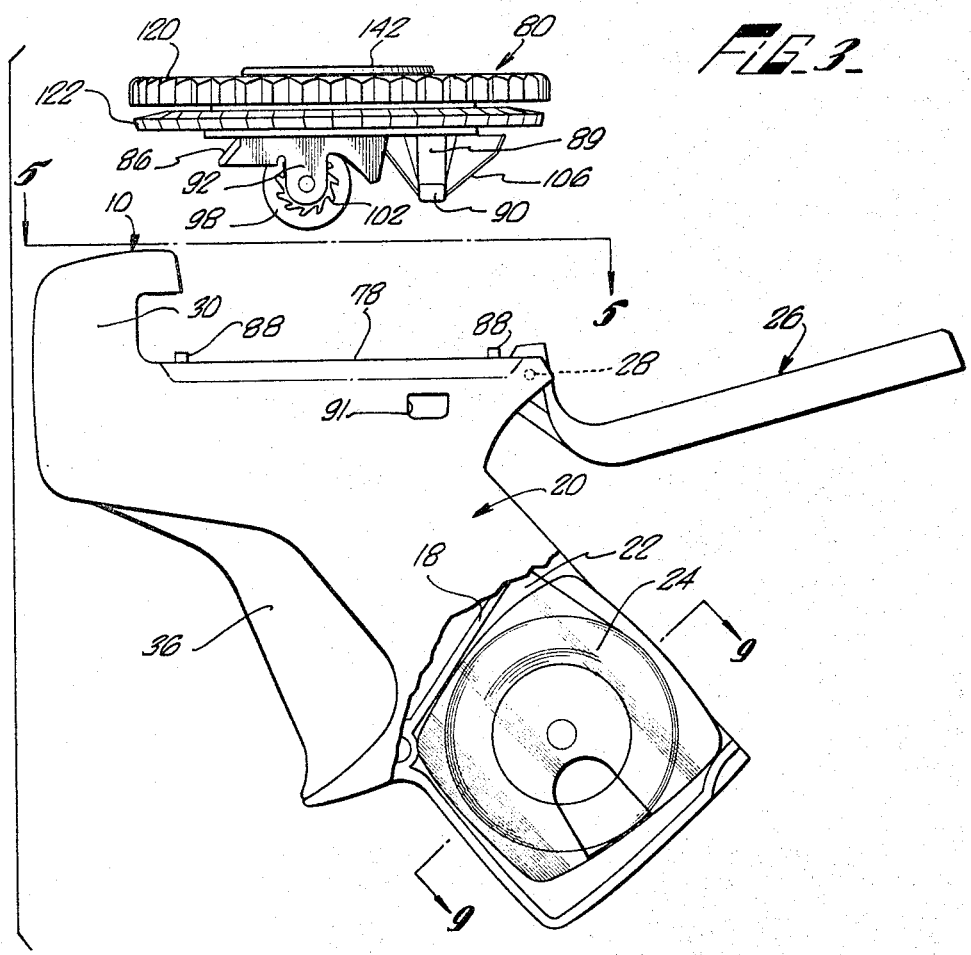
FIG. 3 is an exploded vertical view showing a unitary die assembly removed from the tool base with a portion of the latter broken away to show the strip in the tool handle.

As particularly shown in FIG. 5, the upper surface of the tool base is provided with an opening 78 to accommodate a unitary die assembly 80. The die assembly removed from the tool is shown in FIG. 3.

The elements of the unitary die assembly are mounted on a die carrier 82 which includes a planar base 84 and a skirt 86 depending from the base. Planar base 84 is fitted with a lug 87 at each of its four corners. These lugs are resilient and snap on the outside of posts 88 projecting upwardly from the upper surface of the tool base. The lugs position the unitary die assembly on the upper surface of the tool base. Supports 89 depend from opposite sides of the base near one end, each support being fitted with an ear 90. The ears snap into slots 91 in the side wall and closure wall of the base, thereby removably locking the unitary die assembly to the tool base.

Figure 7:
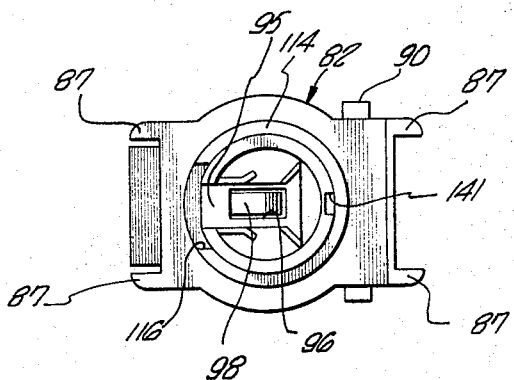
FIG. 7 is a plan view taken along line 7—7 of FIG. 6.

A pair of spaced-apart extensions 92 depend from skirt 86, and a flange 94 depends from base 84 between supports 89. With its lower end beginning at the bottom edge of the skirt, an inclined carrier tape channel 95 (see FIG. 7) extends upwardly to terminate slightly above planar base 84. When the die carrier is inserted within the tool base, carrier tape channel 95 combines with tool base tape channel 29 to provide a continuous tape guide path. A rectangular aperture 96 is formed centrally in the carrier tape channel, as particularly shown in FIG. 7.

A feed wheel 98 and a pair of ratchet wheels 100, 102 disposed on opposite sides of the feed wheel are rotatably mounted on a shaft 104 supported at its opposite ends by spaced-apart extensions 92. The ratchet wheels and the feed wheel rotate as a unit. The ratchet wheels may be formed at opposite ends of one piece of stock and joined by a hub over which a rubber "tire" is fitted to provide a feed wheel. A segment of the feed wheel extends through the aperture in carrier tape channel 95.

When the die assembly is locked into the tool base, ratchet wheel 102 is engaged by pawl 54 secured to lever 36 and ratchet wheel 100 is engaged by catch 72 of the feed latch spring. As has been previously described, the pawl and the feed latch spring are in spaced-apart vertical planes. The pawl and ratchet wheels, together with the feed latch spring, provide the means for intermittent advance of the tape, as will be described. The number of teeth and tooth orientation of the ratchet wheels varies dependent upon the size of the symbols to be embossed since the required degree of linear advance of the tape is dependent upon the width of the symbols. By disposing the spring and the pawl on opposite sides of the feed wheel, it becomes possible to engage properly these fixed members with the differently oriented teeth of ratchet wheels in different die assemblies.

Flange 94 depending from base 84 of the die carrier includes a recess 105 within which a central folded-over portion of a back-up spring 106 is retained. A back-up roller 108 is mounted to a flange 110 secured at an end of spring 106 adjacent the feed roller. The other end of spring 106 bears against cover plate 26 adjacent a rounded shoulder 112 of the cover plate. The fulcrum of the back-up spring is at recess 105. With the cover plate in the closed position, it exerts a force against spring 106 which acts through the fulcrum to press back-up roller 108 against feed roller 98 and to grip tape 25 between the rollers. When the cover plate is opened, the back-up roller is released from its engagement with the feed roller because the rotation of the rounded shoulder 112 of the cover plate into the position adjacent the end of the spring removes the biasing force. This enables a user to thread the tape strip between the feed roller and the back-up roller to initiate feeding of the tape.

Back-up spring 106 is biased against cover plate 26 in a position such that, upon closing of the cover plate, the force exerted by the spring against the cover plate is above the center of the cover's pivot point, namely, hinge pin 28. A moment of force is thereby produced and acts to close and to maintain closed the cover plate.

Figure 6:
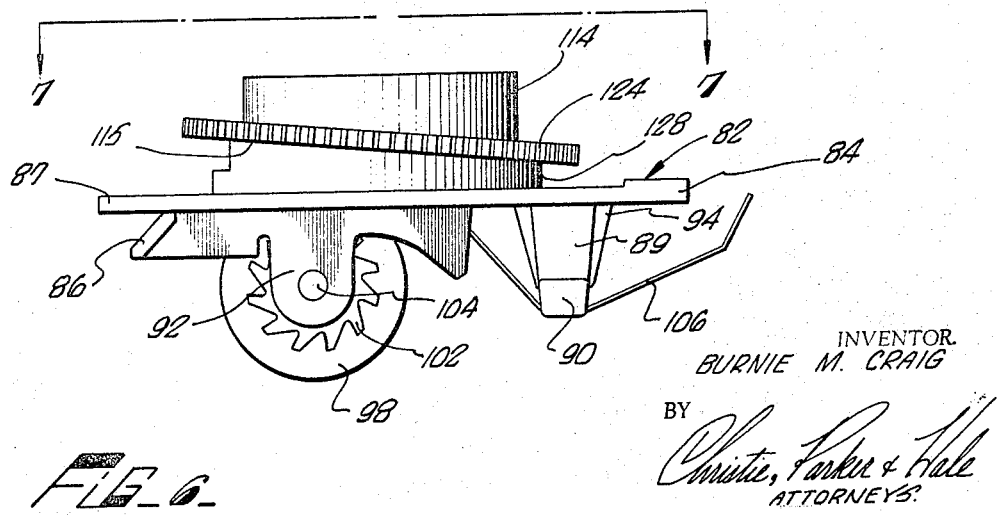
FIG. 6 is a vertical view showing the die assembly with the die discs removed to reveal the disc engaging gear.
Figure 6:
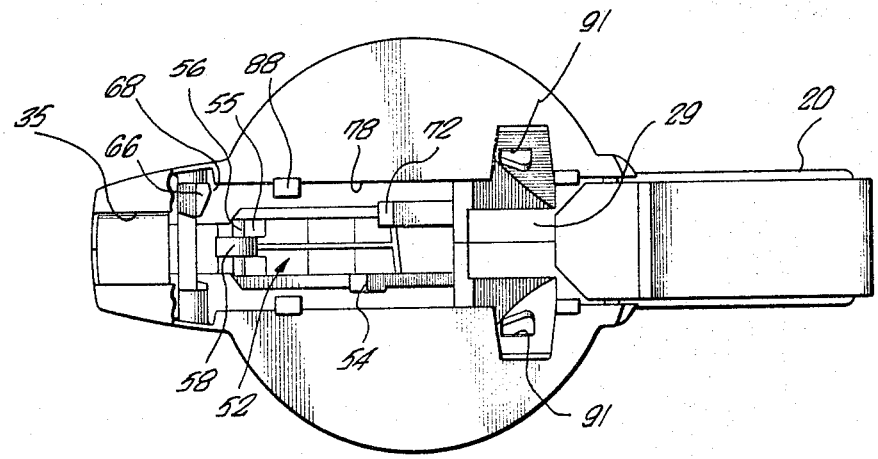

Extending upwardly from the upper surface of planar base 84 is a tubular turret 114 disposed over carrier tape channel 95. An inclined annular gear support ledge 115 (see FIG. 6) is provided around the turret. The portion of the turret facing the outfeed end of the tool when the die assembly is locked in the tool is vertically slotted at 116 (see FIG. 7) to enable the tape strip from the carrier tape channel to pass through the turret.

Concentrically supported on the turret and held apart by a spacer 118 are an upper die disc 120 and a lower die disc 122. The die discs are in apposition and are rotatably tied together by a gear 124 supported on the inclined annular ledge of the turret, the gear being particularly shown in FIG. 6. Lower die disc 122 includes a depending hub 126 which slidably fits over an enlarged diameter portion 128 (see FIG. 6) of the turret, and includes a central aperture 130 fitted with internal gear teeth 132. Upper die disc 120 includes a depending circular flange 134 fitted with internal gear teeth 136 and includes a central aperture 138 which slidably fits over turret 114. At its upper inclined end, gear 124 engages gear teeth 136 of the upper disc, and at its lower inclined end, gear 124 engages gear teeth 132 of the lower disc. Spacer 118 is inserted so that the portion of it toward the tool outfeed end partially overlies the lower die disc. This portion is provided with a pair of parallel depending ribs 140 which define a tape path over the lower disc. Although not shown, the spacer includes a projection which engages a slot 141 (see FIG. 7) in the turret. In this manner, no rotation of the spacer occurs as the die discs are rotated to select a symbol to be embossed.

A die cap 142, slidably fitted within turret 114, retains the above-described operative elements in place on the turret.

The upper and lower die discs carry a set of pairs of corresponding forming dies including both embossing dies and cut-off dies. The female member of each pair of embossing dies is carried on upper die disc 120. The lower member of each pair of dies, embossing or cut-off, is carried on the lower die disc and is separated from the adjacent dies by slots 144, as particularly shown in FIG. 2, to thereby separate the lower die wheel into a plurality of radially extending fingers 146. Edge 68 of detent 66, previously described, engages positioning detent grooves 148 formed in the upper die disc. A positioning groove is associated with each pair of embossing dies. Since, however, detent 66 is offset from the center of the discs to permit radial outfeed, as shown in FIG. 5, the detent engages a groove associated with a symbol different from the groove of the symbol to be embossed. Radially extending fingers 146 are resilient and are adapted to be selectively engaged by roller 58 on lever 36, as will be described.

Upper cut-off die 150 is shown positioned in the upper die disc in FIG. 1. It includes a radially inner knife-edge 152 and a radially outer knife-edge 154. The upper cut-off die as well as lower cut-off die 156 are shown in enlarged sectional detail in FIG. 8. The upper cut-off die is fitted in the upper die disc and includes a steel eject spring 158 held beneath a steel plate 160 integrally formed with knife-edges 152 and 154. It is retained in place by having its ends bent over recesses in the upper face of upper die disc 120. The eject spring occupies the space between the parallel pair of knife-edges, of which radially outer knife-edge 154 is shown in FIG. 8.

The knife-edges bear against a steel anvil plate 162 in the lower cut-off die. The anvil plate includes a recessed portion 164 and a raised portion 166 radially inwardly of the recessed portion. The width of the recessed portion is greater than the tape width. The recessed portion lies in a plane below the plane of the raised portion to an extent approximately equal to the thickness of the backing material joined to the embossable tape. In this manner, a means for providing a complete cut and a partial cut is achieved.

When the knife-edges engage the anvil plate, inward knife-edge 152 bears against the raised portion of the anvil and cuts through the tape and whatever backing material is joined to the tape. Outward knife-edge 154 is aligned with the recessed portion of the anvil plate so that it cuts through only the tape itself without penetrating the backing material which is depressed into the recessed portion. In this manner, a tab is provided to enable convenient removal of the backing from the tape and thereby to expose the adhesive on the tape itself. Because, however, of the criticality of the dimensions involved, it occasionally happens that both knife-edges cut through the tape and the backing. In prior art devices, the accidentally removed tabs accumulate in the space between the knife-edges and build up to a point where they interfere with the cutting action. This difficulty is avoided by the die cut-off arrangement shown in FIG. 8 since, in the event of inadvertent cutting of the tab, spring 158 ejects the cut-off tab from between the knife-edges.

Lower die cut-off plate 156 is of a laminated construction in which anvil plate 162 and a bottom steel plate 168 are spot welded to an intermediate steel plate 170 having a width less than either the anvil plate or the bottom plate. Nibs 172 (indicated by hidden lines) are formed in the lower die disc and snap into the intermedial spaces between the sides of the anvil plate and the bottom plate. The lower cut-off die plate is thereby firmly secured in place without the necessity for use of adhesive or mechanical fasteners. In addition, the bottom steel plate provides a hard underneath wearing surface for contact by roller 58, as will be described.

*Operation of the tool*

In the use of the tool, the user inserts roll 24 of tape in compartment 22 and, with handle cover plate 26 in the open position, threads it between feed roller 98 and back-up roller 108. As is particularly seen in FIG. 9, the width of compartment 22 is sufficient to accommodate tapes of varying widths. If a relatively narrow tape is selected, as, for example, one ⅜″ in width, the tape can be contained within a cartridge 174 having a width sufficient to retain the assembly firmly within the compartment. Wider tapes can be accommodate by elimination of the cartridge. It is to be noted that tool base tape channel 29 has a width sufficient to accommodate the tapes of different widths.

After the cover plate is closed, the tape is gripped between the back-up roller and the feed wheel, as has already been described. To advance the tape to the forming station, lever 36 is partially depressed so that pawl 54 is disengaged from ratchet wheel 102. The tape remains stationary as the lever is depressed because the wheel is held against rotation by feed latch spring 70. Depression of lever 36 biases return spring 40 between the lever and internal bridging member 18. As the lever is released, the return spring urges it toward its lowermost position. On the release or downstroke of the lever, pawl 54 engages a tooth of ratchet wheel 102 and rotates the ratchet wheel, together with feed wheel 98 and ratchet wheel 100, so as to advance the tape a distance sufficient to provide spacing between words and between the ends of labels. Catch 72 of feed latch spring 70 positively registers with the next tooth of ratchet wheel 100 as pawl 54 partially rotates the feed assembly.

By a series of partial depressions of lever 36, tape 25 is advanced between the feed wheel and the back-up roller to a position between the male and female dies of the die discs. The proportions of the operating elements of the tool are such that this occurs prior to the time that roller 58 engages a die part at the forming station. Accordingly, if the user releases the lever as soon as a click is heard, the tape advances without an embossing or cut-off operation.

The user rotates the die disc pair, positively registered by gear 124 to move as a unit, until the selected symbol is opposite an indicator in the outfeed end. It will be understood that, although the following description is for purposes of illustration directed to embossing, cutting is accomplished in the same manner by positioning the cut-off dies in the operative position. During rotation of the die disc pair, detent 68 is moved outwardly as the ungrooved portions of upper die disc 120 are rotated past it. The outward movement of the detent causes tab 60 to bear against force finger 50, which has sufficient resiliency to allow the required deflection without unduly restricting rotation of the die discs.

Figure 2:
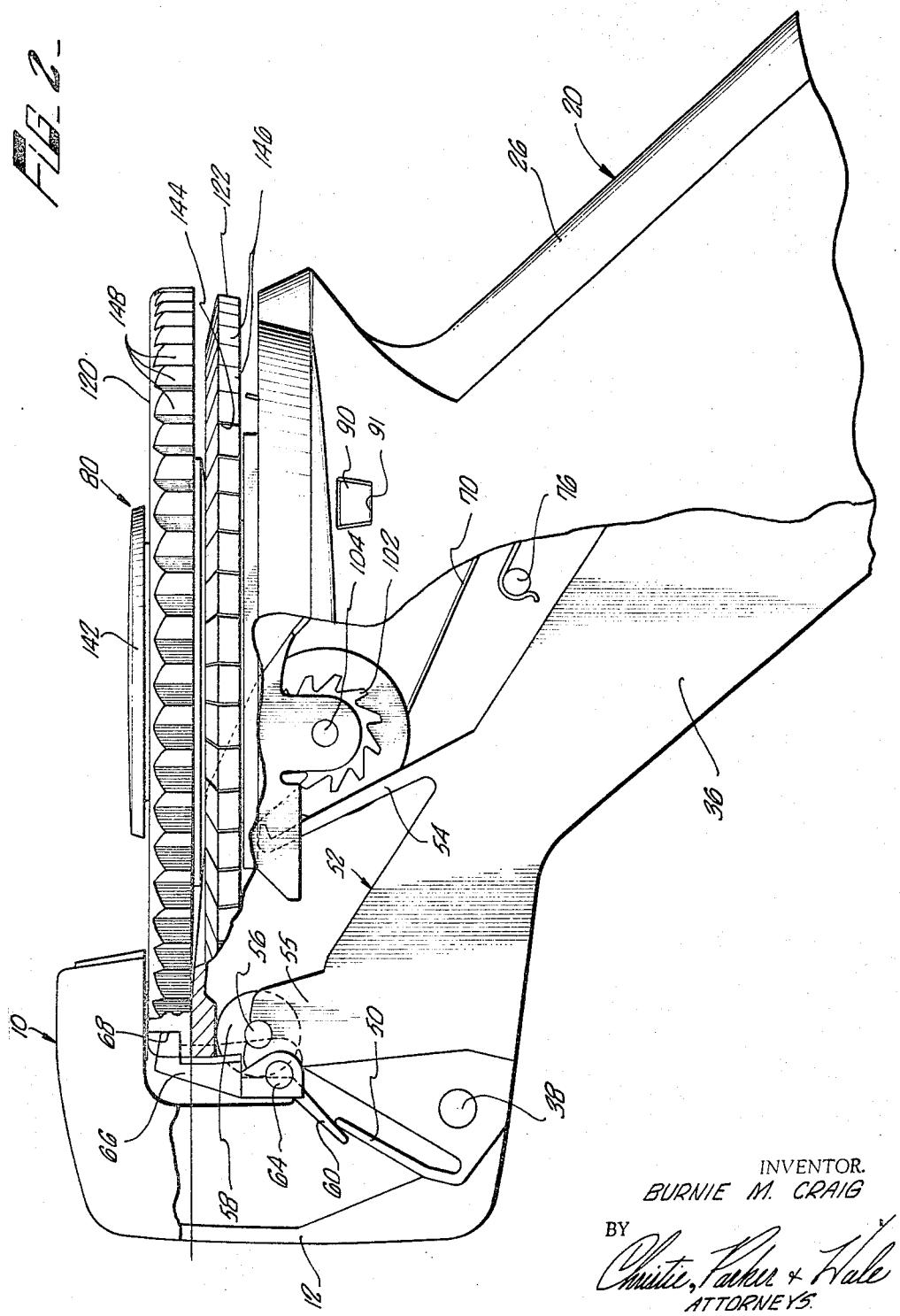
FIG. 2 is a median vertical partially-sectioned view of the tool with a pair of dies actuated to emboss a strip.

With the tape strip between the male and female dies of the disc pair, full depression of lever 36 causes it to pivot on shaft 38 so that roller 58 is advanced to the position show in FIG. 2. Is this position, the roller engages the male die on the resilient finger disposed above the roller and raises it to press the tape into the corresponding female die, thereby embossing the selected symbol on the tape. As shown in FIG. 2, the dies are pressed together between roller 58 and metal insert 34 in the outfeed end. The actuation of the selected pair of dies to emboss or cut the strip is accomplished by an arrangement in which a movement of the end of lever 36 remote from shaft 38 through a relatively long distance produces travel of the roller through a relatively short distance. A greater mechanical advantage is obtained so that a maximum force is applied to the actual embossing or cutting operation. The arrangement makes possible use of a shorter lever with attendant reduction in over-all dimensions of the tool.

Simultaneously with the above-described movement of roller 58, force finger 50 is pressed against tab 60 and pivots the detent around shaft 64 so that the detent positively engages a positioning groove. The disc pair is therefore firmly held in position at the time the forming step is performed. Depression of the lever disengages pawl 54 from its ratchet wheel as shown in FIG. 2. When the handle is released, pawl 54 engages the ratchet wheel to thereby turn the feed wheel and advance the tape to position it for the next embossing step. The movement of the ratchet wheels and the feed wheel is the same as has been already described with respect to partial depression of the lever to advance the tape without embossing or cutting.

If the user desires to utilize different size symbols or different combinations of symbols, unitary die assembly 80 is released by pressing ears 90 and lifting the assembly out of the tool base. Another unitary die assembly is then snapped into place and when this is done its elements are operatively associated with those contained within the tool base. Each die assembly has a die carrier tape channel of sufficient width to accommodate tapes of the varying widths required for the size of symbols on the pair of die discs.

The foregoing description has been made to illustrate the several aspects of the present invention of an embossing tool. It will be understood that modifications in detail and in configuration may be made within the scope of the invention as described.

I claim.

1. A tool for embossing a continuous strip of material comprising a unitary die assembly including two apposed die discs rotatively tied together for selection of any one of a set of pairs of corresponding dies including embossing dies of preselected size carried on the discs and for positioning the selected pair of dies on opposite sides of the strip of material at a forming station, feed means for engaging the strip of material to advance it upon actuation of the feed means a distance corresponding to the preselected die size, locking means for removably securing the die assembly to a tool base, and strip guide means in the assembly to guide the strip to the forming station; and a separable tool base including means to actuate the feed means to advance the strip of material and means for actuating the selected pair of dies positioned at the forming station when the die assembly is secured to the tool base.

2. A tool for embossing a continuous strip of material comprising a unitary die assembly including two apposed die discs rotatively tied together for selection of any one of a set of pairs of corresponding dies carried on the discs and for positioning the selected pair of dies on opposite sides of the strip of material at a forming station, feed means for engaging the strip of material to advance it upon actuation of the feed means, locking means for removably securing the die assembly to a tool base, and a strip guide channel in the assembly to guide the strip to the forming station; and a separable tool base including means to actuate the feed means to advance the strip of material, means for actuating the selected pair of dies positioned at the forming station, means in the base engageable by the locking means of the die assembly, and strip guide means disposed in the base to coincide with the strip guide channel of the die assembly to provide a continuous strip path when the die assembly is secured to the tool base.

3. A tool in accordance with claim 2 wherein said pairs of corresponding dies include pairs of embossing dies and at least one pair of cut-off dies whereby actuation of the selected pair of dies causes an embossing or cut-off operation.

4. A tool for embossing a continuous strip of material comprising a unitary die assembly including two apposed die discs rotatively tied together for selection of any one of a set of pairs of corresponding dies including embossing dies of preselected size carried on the discs and for positioning the selected pair of dies on opposite sides of the strip of material at a forming station, feed means for engaging the strip of material to advance it upon actuation of the feed means a distance corresponding to the preselected die size, locking means for removably securing the die assembly to a tool base, and a strip guide channel in the assembly to guide the strip to the forming station; and a separable tool base including means to actuate the feed means to advance the strip of material, means for actuating the selected pair of dies positioned at the forming station, means in the base engageable by the locking means of the die assembly, a compartment constructed to accommodate rolls of strips of varying widths, and strip guide means adjacent the compartment and disposed in the base to coincide with the strip guide channel of the die assembly to provide a continuous strip path when the die assembly is secured to the tool base.

5. A tool for embossing a continuous strip of material comprising a unitary die assembly including a platform, two apposed die discs rotatively supported on the platform and rotatively tied together for selection of any one of a set of pairs of corresponding dies carried on the discs and for positioning the selected pair of dies on opposite sides of the strip of material at a forming station, a feed wheel and first and second ratchet wheels supported from the platform and rotatively tied to each other, a roller disposed adjacent the feed wheel, resilient means supporting the roller, locking means for removably securing the die assembly to a tool base, and a strip guide channel in the die assembly to guide the strip to the forming station; and a separable tool base including means for actuating the selected pair of dies positioned at the forming station, advancing means disposed in the tool base to engage the first ratchet wheel and operative to advance said wheel, means disposed in the tool base and engaging the second ratchet wheel to restrain said wheel against movement other than that produced by the advancing means, means in the tool base engageable by the resilient means of the die assembly to releasably bias the roller against the feed wheel, means in the base engageable by the locking means of the die assembly, and strip guide means disposed in the base to coincide with the strip guide channel of the die assembly to provide a continuous strip path when the die assembly is secured to the tool base.

6. A tool for embossing a continuous strip of material comprising a unitary die assembly including a platform, two apposed die discs rotatively supported one above the other on the platform and having internal gear teeth, a single inclined gear interconnected at its upper and lower portions with the gear teeth of the die discs to rotatively tie together the die discs for selection of any one of a set of pairs of corresponding dies carried on the discs and for positioning the selected pair of dies on opposite sides of the strip of material at a forming station, a feed wheel and first and second ratchet wheels supported from the platform and rotatively tied to each other, a roller disposed adjacent the feed wheel, resilient means supporting the roller, locking means for removably securing the die assembly to a tool base, and a strip guide channel in the die assembly to guide the strip to the forming station; and a separable tool base including means for actuating the selected pair of dies positioned at the forming station, advancing means disposed in the tool base to engage the first ratchet wheel and operative to advance said wheel, means disposed in the tool base and engaging the second ratchet wheel to restrain said wheel against movement other than that produced by the advancing means, means in the tool base engageable by the resilient means of the die assembly to releasably bias the roller against the feed wheel, means in the base engageable by the locking means of the die assembly, and strip guide means disposed in the base to coincide with the strip guide channel of the die assembly to provide a continuous strip path when the die assembly is secured to the tool base.

7. A tool for embossing a continuous strip of material comprising a unitary die assembly including a platform including a central turret, two apposed die discs rotatively supported one above the other on the turret, each disc having internal gear teeth, a single gear rotatively supported in an inclined position on the turret and interconnected at its upper and lower portions with the gear teeth of the die discs to rotatably tie together the die discs for selection of any one of a set of pairs of corresponding dies carried on the discs and for positioning the selected pair of dies on opposite sides of the strip of material at a forming station, feed means for engaging the strip of material to advance it upon actuation of the feed means, locking means for removably securing the die assembly to a tool base, and strip guide means in the die assembly to guide the strip to the forming station; and a separable tool base including means to actuate the feed means to advance the strip of material and means for actuating the selected pair of dies positioned at the forming station when the die assembly is secured to the tool base.

8. A tool for embossing a continuous strip of material comprising of a unitary die assembly including two apposed die discs rotatively tied together for selection of any one of a set of pairs of corresponding dies carried on the discs and for positioning the selected pair of dies on opposite sides of the strip of material at a forming station, feed means for engaging the strip of material to advance it upon actuation of the feed means, locking means for removably securing the die assembly to a tool base, and strip guide means in the die assembly to guide the strip to the forming station; and a separable tool base including indexing means positioned to engage one of the discs and hold by a first force the selected pair of dies at the forming station after the die assembly is secured to the tool base, means to actuate the feed means to advance the strip of material, and means for simultaneously actuating the selected pair of dies positioned at the forming station and the indexing means to hold by a second force greater than the first one the selected pair of dies at the forming station.

9 In a tool for embossing a continuous strip of material, two apposed die discs rotatively tied together for selection of any one of a set of pairs of corresponding dies carried on the discs and for positioning the selected pair of dies on opposite sides of the strip of material at a forming station, indexing means consisting of a single indexing member continuously engaging one of the discs to hold by a first force the selected pair of dies at the forming station, and means for simultaneously actuating the selected pair of dies positioned at the forming station and said indexing means to hold by a second force greater than the first force the selected pair of dies at the forming station.

10. In a tool for embossing a continuous strip of material, two apposed die discs rotatively tied together for selection of any one of a set of pairs of corresponding dies carried on the discs and for positioning the selected pair of dies on opposite sides of the strip of material at a forming station, a single detent member continuously engaging one of the discs with a first force, the detent member being mounted for pivotal movement, a lever pivotally mounted at one end, first and second means joined to the lever and operative upon pivotal movement of the lever to engage separately and simultaneously the detent member and the selected pair of dies, respectively, the first means of pivoting the detent member to hold by a second force greater than the first force the selected pair of dies at the forming station and the second means actuating the selected pair of dies positioned at the forming station.

11. In a tool for embossing a continuous strip of material, two apposed die discs rotatively tied together for selection of any one of a set of pairs of corresponding dies carried on the discs and for positioning the selected pair of dies on opposite sides of the strip of material at a forming station, a positioning recess in one disc for each pair of corresponding dies, indexing means mounted on a shaft for pivotal movement and including a single detent member above the shaft positioned to continuously engage with a first force a disc positioning recess, the detent member defining a tab below the shaft, a lever pivotally mounted at one end, a resilient force finger joined to the lever to abut the tab, and die actuating means joined to the lever, the force finger and the die actuating member being positioned on the lever whereby pivotal movement of the lever causes the force finger to bear against the tab so as to urge the detent member against a disc positioning recess with a second force greater than the first force and simultaneously causes the die actuating means to actuate the selected pair of dies positioned at the forming station.

12. In a tool for embossing a continuous strip of material, two apposed die discs rotatively supported one above the other for rotation about axes substantially common to each other, each disc having internal gear teeth, a single gear supported for rotation in a plane inclined to said axes and defining external gear teeth engaged at locations spaced angularly about said axes, with the gear teeth of the die discs to rotatively tie together the die discs for selection of any one of a set of pairs of corresponding dies carried on the discs and for positioning the selected pair of dies on opposite sides of the strip of material at a forming station, means for actuating the selected pair of dies positioned at the forming station, intermittent drive means for advancing the strip of material, and means for guiding the strip of material to the forming station.

13. In a tool for embossing a continuous strip of material, a platform including a central turret, two apposed die discs rotatively supported one above the other on the turret, each disc having internal gear teeth, a single gear rotatively supported in an inclined position on the turret and interconnected at its upper and lower portions with the gear teeth of the die discs to rotatively tie together the discs for selection of any one of a set of pairs of corresponding dies carried on the discs and for positioning the selected pair of dies on opposite sides of the strip of material at a forming station, means for actuating the selected pair of dies positioned at the forming station, intermittent drive means for advancing the strip of material, and means for guiding the strip of material so that the edges of the strip are parallel to and on opposite sides of an imaginary plane containing the axes of the die discs as the strip is advanced to the forming station.

14. In a tool for embossing a continuous strip of material, two apposed die discs rotatively tied together for selection of any one of a set of pairs of corresponding dies carried on the discs and for positioning the selected pair of dies on opposite sides of the strip at a forming station, means for guiding the strip along the direction of the length of the tool to the forming station, a feed wheel disposed rearwardly of the forming station, a strip storage compartment in the body rearwardly of the feed means, a cover pivotally mounted and covering the compartment when in a closed position, a roller, support means supporting the roller for rotation about an axis movable relative to the feed wheel and to the cover and cooperating with the cover for urging the roller against the feed wheel when the cover is closed and for imposing upon the cover in the closed position thereof a force moment urging the cover into said closed position.

15. Tool in accordance with claim 14 wherein the support means is a resilient member.

References Cited by the Examiner

UNITED STATES PATENTS

| | | | |
|---|---|---|---|
| 128,783 | 7/1872 | Blondel | 30—130 |
| 147,831 | 2/1874 | Dingwall | 30—130 |
| 775,354 | 11/1904 | Roovers et al. | 197—6.7 |
| 953,194 | 3/1910 | Gressman | 30—130 |
| 1,271,231 | 7/1918 | Schroder | 197—6.4 |
| 1,453,867 | 5/1923 | Fanslow | 197—6.4 |
| 1,692,436 | 11/1928 | Deare | 30—130 |
| 1,806,266 | 5/1931 | Sawle | 30—130 |
| 1,940,438 | 12/1933 | Stowell | 30—130 X |
| 2,615,245 | 10/1952 | Schaumleffel | 30—130 |
| 2,895,584 | 7/1959 | Hickerson et al. | 197—152 |
| 2,979,179 | 4/1961 | Anglim et al. | 197—6.7 |
| 3,001,628 | 9/1961 | Rice | 197—52 |
| 3,116,820 | 1/1964 | Owen | 197—6.7 |
| 3,129,800 | 4/1964 | Bogeaus | 197—6.7 |
| 3,133,495 | 5/1964 | De Man | 197—6.7 X |
| 3,155,215 | 11/1964 | Avery | 197—6.7 |

ROBERT E. PULFREY, *Primary Examiner.*

EDGAR S. BURR, *Assistant Examiner.*